United States Patent
Emilsson et al.

(10) Patent No.: US 6,732,841 B1
(45) Date of Patent: May 11, 2004

(54) BLOCK HOLDER FOR A BOGIE BRAKE

(75) Inventors: Fred Emilsson, Trelleborg (SE); Johan Nyman, Lund (SE)

(73) Assignee: Sab Wabco AB, Landskrona (SE)

( * ) Notice: Subject to any disclaimer, the term of this patent is extended or adjusted under 35 U.S.C. 154(b) by 0 days.

(21) Appl. No.: 10/130,389

(22) PCT Filed: Nov. 16, 2000

(86) PCT No.: PCT/SE00/02246
§ 371 (c)(1),
(2), (4) Date: Aug. 7, 2002

(87) PCT Pub. No.: WO01/36247
PCT Pub. Date: May 25, 2001

(30) Foreign Application Priority Data
Nov. 18, 1999 (SE) .............................. 9904185

(51) Int. Cl.[7] .............................................. B61H 13/36
(52) U.S. Cl. .................. 188/222.1; 188/220.1; 188/219.6; 188/221.1; 188/236
(58) Field of Search .................. 188/153 A, 153 R, 188/233.3, 220.1, 220.6, 219.1, 221.1, 222.1, 219.6, 76, 207, 208, 236, 225.6; 105/182.1, 167

(56) References Cited
U.S. PATENT DOCUMENTS

| | | | | |
|---|---|---|---|---|
| 1,866,999 A | * | 7/1932 | Busch ...................... | 188/53 |
| 2,093,797 A | * | 9/1937 | Baselt ...................... | 188/210 |
| 2,886,146 A | * | 5/1959 | Klasing, Jr. .............. | 188/219.1 |
| 2,946,410 A | * | 7/1960 | Spaeth .................... | 188/219.6 |
| 3,998,299 A | * | 12/1976 | Fuller ..................... | 188/223.1 |
| 4,211,311 A | * | 7/1980 | McMullen ................ | 188/209 |
| 4,830,148 A | * | 5/1989 | Hart et al. ............... | 188/52 |
| 5,062,505 A | * | 11/1991 | Sjarne et al. ............. | 188/153 R |
| 5,452,776 A | * | 9/1995 | Kohler .................... | 188/58 |
| 5,947,236 A | * | 9/1999 | Sauter .................... | 188/228.1 |
| 6,241,057 B1 | * | 6/2001 | Hiatt ....................... | 188/219.1 |

* cited by examiner

Primary Examiner—Jack Lavinder
Assistant Examiner—Mariano Sy
(74) Attorney, Agent, or Firm—Breiner & Breiner, L.L.C.

(57) ABSTRACT

A rail vehicle bogie brake has a brake beam (4, 5). Which at its end is provided with a brake block holder (8) having a brake block (9) for brake application against a tread of a wheel. The brake block holder has a transverse cylinder (19) for its pivotable connection with the brake beam. A mounting shaft (14) is attached in the end of the brake beam and is provided with a sleeve (16). The sleeve engages the mounting shaft and has an outer diameter corresponding to the inner diameter of the cylinder. A sleeve plate (17) is held against the sleeve, which is slightly longer than the cylinder, by means of screws (18) attached in the mounting shaft and prestressing the sleeve.

7 Claims, 3 Drawing Sheets

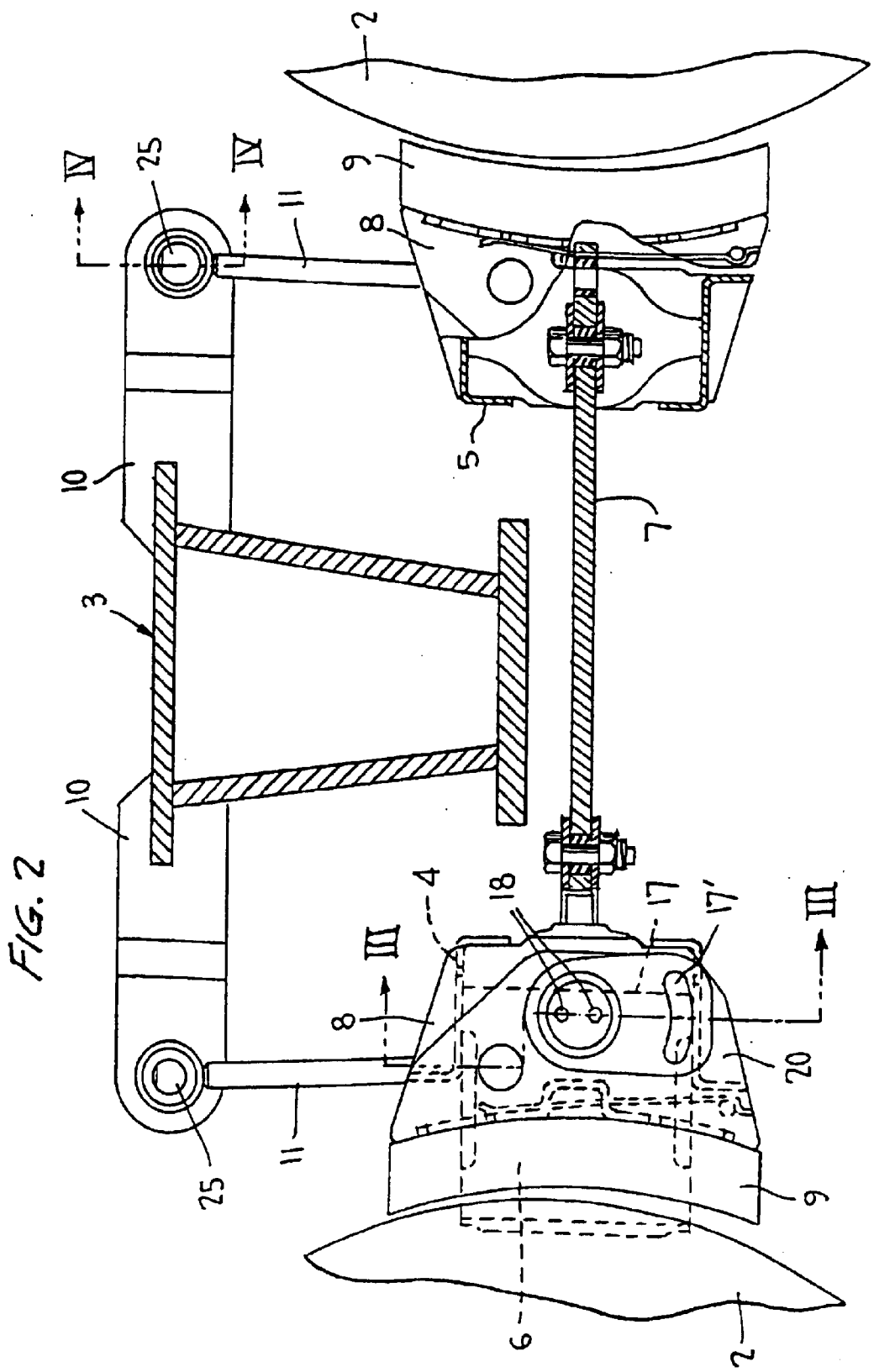

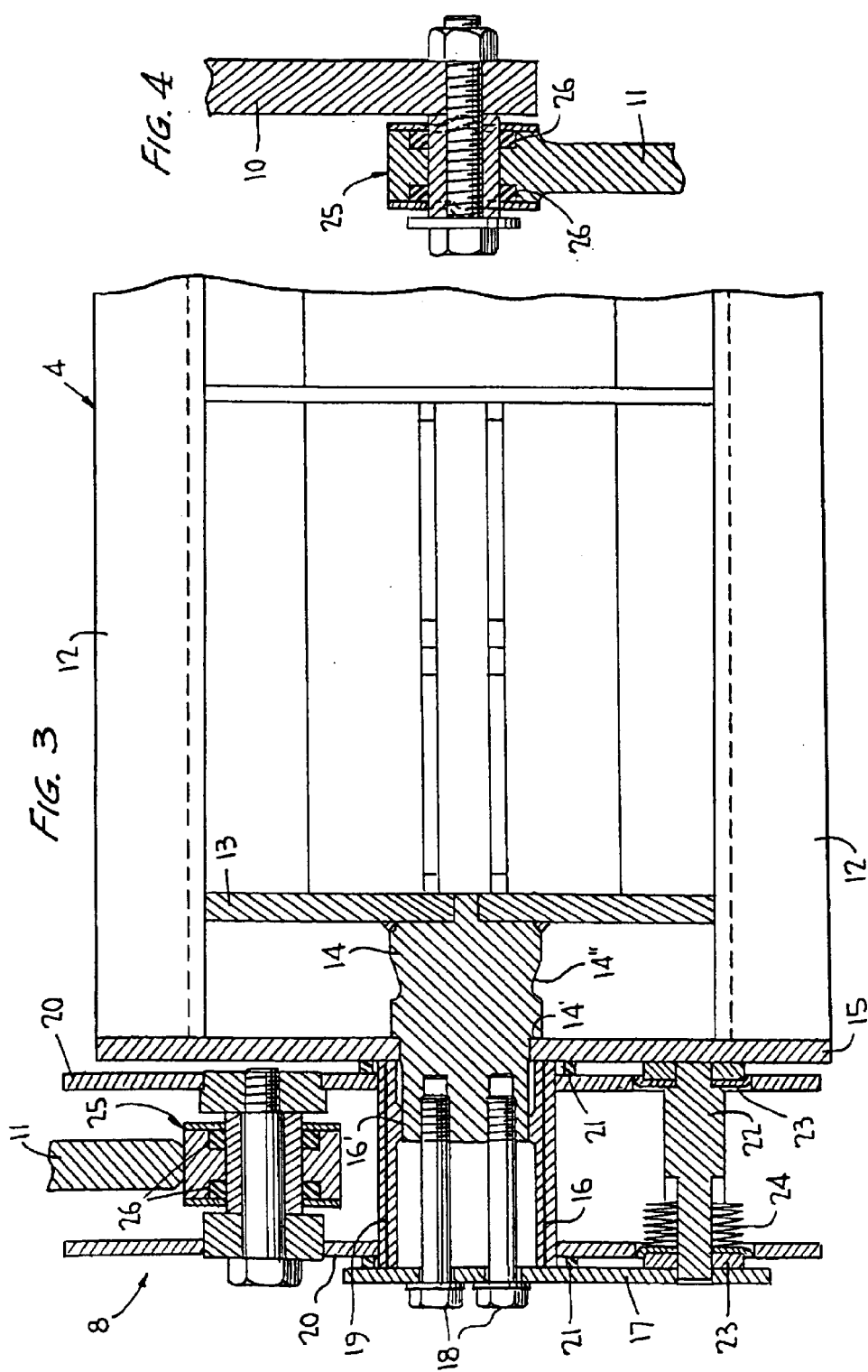

BLOCK HOLDER FOR A BOGIE BRAKE

TECHNICAL FIELD

The present invention relates to a brake beam for a rail vehicle bogie brake being provided at its end with a brake block holder, which may be fitted with a brake block for brake application against the tread of a wheel, wherein the brake block holder has a transverse cylinder for its pivotable connection with the brake beam.

BACKGROUND OF THE INVENTION

In certain cases it may be satisfactory to mount the brake block holders directly to the ends of the brake beam without allowing any relative pivotal movements between the beam and the brake block holders.

However, it is more common that such relative pivotal movements are allowed for coping with the relative movements occurring between the beam and the wheels with which the blocks of the holders are to brakingly cooperate.

The present invention relates to a brake beam with pivotably attached brake block holders. For this purpose each brake block holder is provided with a standardized transverse cylinder for its pivotable connection with the brake beam.

The main object of the invention is to attain a favourable and cheap pivotal mounting of the brake block holder to the brake beam with good force transmission between the parts. This mounting shall provide stability but still flexibility for the brake block holder, and it shall be simple to mount and dismount, for example for exchange of worn-out parts.

THE INVENTION

This is according to the invention attained in that a mounting shaft is attached in the end of the brake beam and is provided with a sleeve engaging the mounting shaft and having an outer diameter corresponding to the inner diameter of the cylinder and in that means are provided for holding the sleeve to the mounting shaft and for forming a transverse stop for the brake block holder.

Said means are preferably a sleeve plate held against the sleeve, which is slightly longer than the cylinder, by means of screws attached in the mounting shaft and prestressing the sleeve.

The sleeve, which is a wear part in the design, is not only prestressed for a favourable force transmission but is also easy to remove by removing the screws and the sleeve plate.

An improved and controlled application of bending moments from the sleeve to the mounting shaft is obtained by the provision of an internal force-transmitting ring in the sleeve in engagement with the mounting shaft.

A favourable mounting and force transmission is attained in that the mounting shaft is provided with an abutment for a brake beam end plate, against which the sleeve in its turn is applied.

BRIEF DESCRIPTION OF THE DRAWINGS

The invention will be described in further detail below under reference to the accompanying drawings, in which FIG. 2 is a side view, partly sectioned, of a bogie brake with block holders as shown in FIG. 1, FIG. 3 is a sectional view—substantially along the line III—III in FIG. 2—through a brake block holder according to the invention, and FIG. 4 is a sectional view—substantially along the line IV—IV in FIG. 2—through an upper suspension of a brake block hanger for a brake block holder according to the invention.

DETAILED DESCRIPTION OF A PREFERRED EMBODIMENT

Figure 1:
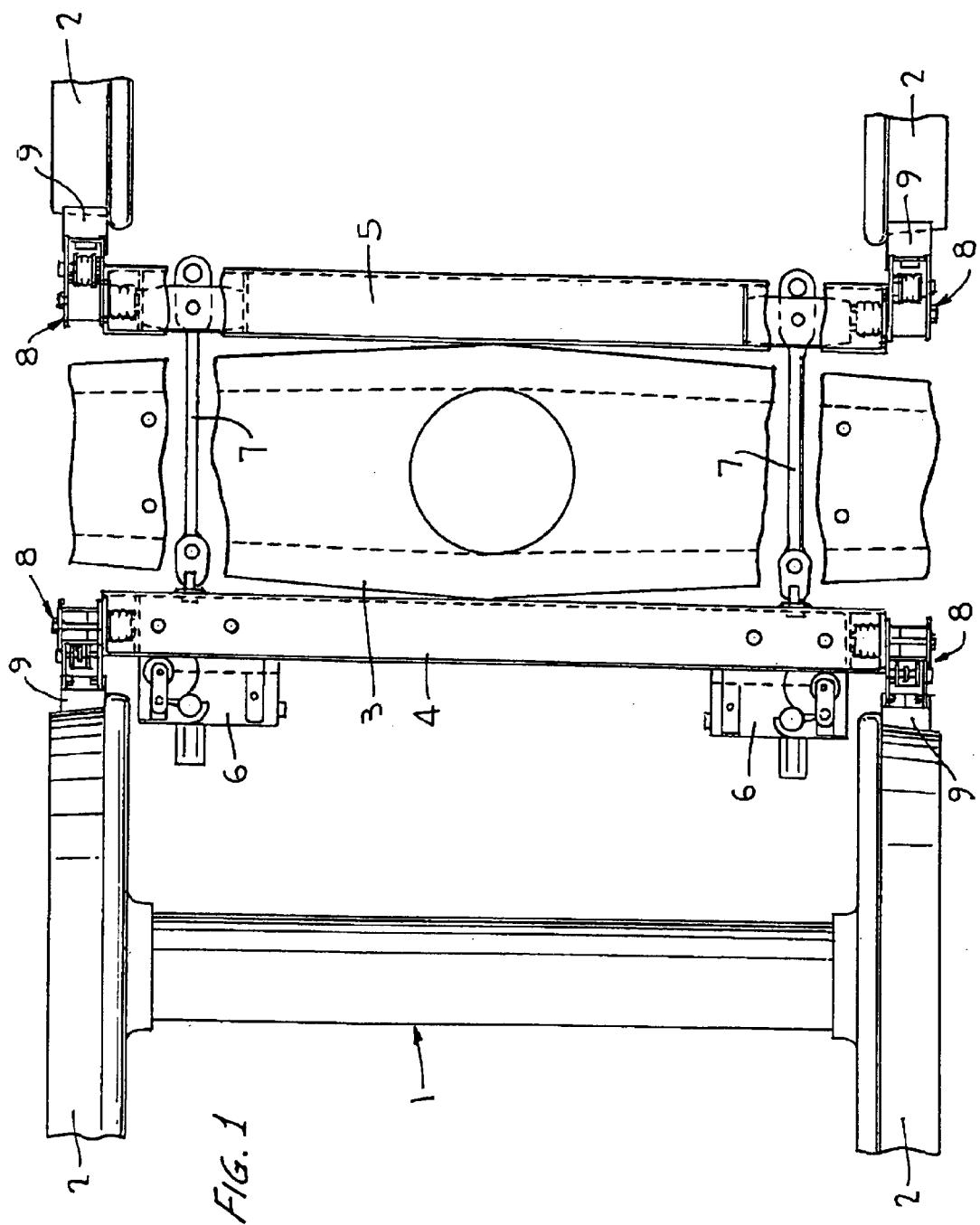
FIG. 1 is a top view of relevant parts of a rail vehicle bogie with a bogie brake incorporating brake block holders according to the invention.

FIG. 1 is a top view primarily of a bogie brake, and the bogie in which it is mounted is only suggested by means of a bolster 3. However, it is well known to the person skilled in the art that in a bogie for a rail vehicle, wheel sets 1 with wheels 2 are journalled in side frames (not shown), which are connected by springs (not shown) to a transverse bolster 3. At its center this bolster 3 is rotatably journalled to a rail vehicle underframe (not shown).

In a way to be described two brake beams 4 and 5 are suspended from the bolster 3. The brake beam 4 to the right in FIG. 1 is provided with two brake units 6, whose brake force applying push rods are connected to push bars 7, in turn connected to the other brake beam 5. Each brake beam 4 and 5 is at each end provided with a brake block holder 8 having a replacable brake block 9 for cooperation with the respective tread of the wheels 2.

At the admission of pressurized brake fluid (compressed air) to the brake units 6 a brake force will be applied to the wheels 2 via the brake block holders 8 and the brake blocks 9.

The bolster 3 is shown in section in FIG. 2. Towards its end it is provided with suspension brackets 10 for pivotal attachment of suspension links 11, at their opposite ends pivotally connected to the brake block holders 8 in a way to be further described. Also visible in FIG. 2 are wheels 2, brake beams 4 and 5, a brake unit 6 (mostly hidden), a push bar 7, brake block holders 8 and brake blocks 9.

A brake block holder 8 and its connection to the end of a brake beam 4 is illustrated in FIG. 3, to which reference is now primarily made. The brake beam is in this case built-up of Z-shaped longitudinal plates 12 with certain transverse plates, one of which has the reference numeral 13 in FIG. 3.

A cylindrical mounting shaft 14, extending in the longitudinal direction of the beam 4, is attached, preferably by welding, to the transverse plate 13. The shaft 14 extends out of the beam 4 through a hole in a beam end plate 15, for which it is provided with an abutment 14'.

A cylindrical sleeve 16 is arranged on the portion of the mounting shaft 14 extending out of the beam 4 with its end to the right in FIG. 3 in contact with the end plate 15. A sleeve plate 17 is arranged on the opposite free end of the sleeve 16. Screws 18 extend through holes in the sleeve is plate 17 into threaded bores in the end of the mounting shaft 14. By this design the sleeve 16 may be prestressed in relation to the mounting shaft 14, and at the same time the end plate 15 will be clamped against the shaft abutment 14'. The sleeve 16 has an internal force-transmitting ring 16' in contact with the mounting shaft 14 for reasons to be described.

The brake block holder 8 is pivotally connected to the sleeve 16 by means of a cylinder 19, which together with side plates 20, to which it is attached, form the main constituents of the brake block holder 8. The length of the cylinder 19 is slightly less than that of the sleeve 16 in prestressed condition, and its internal diameter is slightly larger than the external diameter of the sleeve 16, so that the cylinder 19 and thus the brake block holder 8 is freely rotatable on the sleeve 16. (The internal diameter of the cylinder 19 may preferably be a standard diameter.) For dampening the movements of the brake block holder 8 on the sleeve 16 and for sealing of the interior, O-rings 21 are provided outside the ends of the cylinder 19, which is slightly longer than the external distance between the side plates 20 of the brake block holder 8.

The described brake block holder 8 is also shown in a side view in FIG. 2. The outer side plate 20, the sleeve plate 17, and the screws 18 are here clearly visible. In a way well known in the art, the brake block holder 8 is provided with a replaceable brake block 9.

The forces and moments created at a brake application will be transferred via the brake block holder cylinder 19, the prestressed sleeve 16, and the mounting shaft 14. The dimensioning of the parts and the shown positioning of the force transmitting ring 16' in the sleeve 16 closer to the beam end plate 15 will lead to an advantageous transmission of forces to the beam 4 via the mounting shaft 14, which will only be exposed to shear forces and a controlled bending moment in that the lever or application area (the force transmitting ring 16') is defined. The force transmission within the shaft 14 itself can be improved by the provision of a circumferential groove 14" thereon.

As has been noted, the brake block holder 8 with the brake block 9 is rotatable around the sleeve 16. In order to keep it in the angular position attained at the previous brake application, it is—as is well known in the art provided with a friction device, which in this instance has the following design (FIG. 3).

In aligned holes in the lower part of the side plates 20 a rod 22 is arranged. To the left in the drawing the rod extends out through an arcuate slot 17' in the sleeve plate 17. In the way shown in the drawing, two ring washers 23 on the rod 22 are in friction engagement with the respective surfaces of the beam end plate 15 and the sleeve plate 17. These ring washers 23 are spring-biassed into this engagement by cup springs 24 on the rod 22.

As has already been stated, the brake beams 4, 5 are suspended together with the brake block holders 8 by means of suspension links 11. Each such suspension link 11 is pivotally connected at its upper end to a suspension bracket 10 and at its lower end to the brake block holder 8. The design of the pivot connections, generally designated 25, is previously known (for example through EP-B-0 503 724) and is not described in detail. It shall not only provide a pivotal connection but also allow certain lateral movements for the brake block holder 8 with a return force to the vertical position. The latter function is accomplished by means of elastic rings 26.

In the design as shown and described the sleeve 16 is exposed to certain wear and may have to be replaced after a number of brake applications. After removal of the screws 18 the sleeve plate 17 may be lifted off and the sleeve 16 be replaced. At the reassembly of the parts, the friction device 22–24 will be locked by the sleeve plate 17.

Modifications are possible within the scope of the appended claims. It is for example to be noted that the suspension means for the brake block holders 8 and thus for the beams 4, 5 do not per se form any part of the invention and may be differently designed. Further, the brake block holder cylinders 19, which as said are standardized elements and do not form any part of the invention, may be differently designed.

What is claimed is:

1. A brake beam for a bogie brake, comprising at each end of the brake beam a brake block holder, which may be fitted with a brake block for brake application against a tread of a wheel, wherein the brake block holder has a transverse cylinder for pivotable connection with the brake beam, wherein a mounting shaft is attached to each end of the brake beam and is provided with a sleeve engaging the mounting shaft and having an outer diameter corresponding to an inner diameter of the cylinder, and means for holding the sleeve to the mounting shaft and for forming a transverse stop for the brake block holder.

2. A brake beam according to claimed 1, further comprising a sleeve plate held against the sleeve, said sleeve plate being slightly longer than the cylinder, by means of screws attached in the mounting shaft and prestressing the sleeve.

3. A brake beam according to claim 1, wherein the sleeve is provided with an internal force-transmitting ring in engagement with the mounting shaft.

4. A brake beam according to claimed 1, wherein the sleeve engages a brake beam end plate, which in turn engages an abutment of the mounting shaft.

5. A brake beam according to claim 4, further comprising resilient rings arranged around the ends of the cylinder between on one hand either external sides of brake holder side plates and on the other hand the sleeve plate and the beam end plate, respectively.

6. A brake beam according to claim 4, wherein the mounting shaft is fastened to a transverse plate in the brake beam and extends through the brake beam end plate.

7. A brake beam according to claim 4 or 6, further comprising a friction device arranged in coaxial holes in the brake holder side plates and in spring-biased friction engagement with the beam end plate and the sleeve plate.

* * * * *

UNITED STATES PATENT AND TRADEMARK OFFICE
CERTIFICATE OF CORRECTION

PATENT NO.   : 6,732,841 B1
DATED        : May 11, 2004
INVENTOR(S)  : Fred Emilsson and Johan Nyman It is certified that error appears in the above-identified patent and that said Letters Patent is hereby corrected as shown below:

Title page,
Item [57], ABSTRACT,
Line 1, "beam (4, 5) . Which" should read -- beam (4, 5), which --.

Column 2,
Line 54, "sleeve is plate 17" should read -- sleeve plate 17 --.

Column 3,
Line 30, "in the art provided" should read -- in the art - provided --.

Column 4,
Line 18, "bogie brake, comprising" should read -- bogie brake comprising --.
Lines 29 and 36, "claimed 1," should read -- claim 1, --.
Line 40, "around the ends of" should read -- around ends of --.

Signed and Sealed this

Fourth Day of January, 2005

JON W. DUDAS
*Director of the United States Patent and Trademark Office*